(12) United States Patent
Zhang et al.

(10) Patent No.: US 12,386,515 B2
(45) Date of Patent: Aug. 12, 2025

(54) MODIFICATION OF PROGRAM VOLTAGE LEVEL WITH READ OR PROGRAM-VERIFY ADJUSTMENT FOR IMPROVING RELIABILITY IN MEMORY DEVICES

(71) Applicant: Micron Technology, Inc., Boise, ID (US)

(72) Inventors: Peng Zhang, Los Altos, CA (US); Lei Lin, Fremont, CA (US); Hanping Chen, San Jose, CA (US); Li-Te Chang, San Jose, CA (US); Zhengang Chen, San Jose, CA (US); Murong Lang, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/421,893

(22) Filed: Jan. 24, 2024

(65) Prior Publication Data
US 2024/0319886 A1 Sep. 26, 2024

Related U.S. Application Data

(60) Provisional application No. 63/445,812, filed on Feb. 15, 2023.

(51) Int. Cl.
*G06F 3/06* (2006.01)
(52) U.S. Cl.
CPC .......... *G06F 3/0614* (2013.01); *G06F 3/0652* (2013.01); *G06F 3/0679* (2013.01)

(58) Field of Classification Search
CPC .... G06F 3/0679; G06F 3/0652; G06F 3/0614; G06F 12/0246; G06F 3/0604; G06F 3/064; G06F 3/0616; G06F 3/0619
USPC ........... 711/154, 100, 1, 103, 12.001, 12.007
See application file for complete search history.

(56) References Cited

U.S. PATENT DOCUMENTS

| | | | | |
|---|---|---|---|---|
| 9,275,741 B1 * | 3/2016 | Liang | ................. | G11C 16/3454 |
| 9,524,793 B1 * | 12/2016 | Lee | ......................... | G11C 16/10 |
| 2008/0117688 A1 * | 5/2008 | Park | .................... | G11C 16/3454 |
| | | | | 365/185.33 |
| 2009/0034339 A1 * | 2/2009 | Eguchi | ................. | G11C 16/344 |
| | | | | 365/185.33 |
| 2011/0167305 A1 * | 7/2011 | Haratsch | .................. | G11C 7/04 |
| | | | | 714/E11.02 |

(Continued)

*Primary Examiner* — Jared I Rutz
*Assistant Examiner* — Edward Waddy, Jr.
(74) *Attorney, Agent, or Firm* — Lowenstein Sandler LLP

(57) ABSTRACT

A method for receiving a request for performing a programming operation on one or more memory blocks of a memory device, identifying a value of a media endurance metric associated with the one or more memory blocks, determining a programming voltage offset corresponding to the value of the media endurance metric, and performing, using the programming voltage offset, the programming operation on the one or more memory blocks. The method further includes identifying a program-verify voltage level associated with the one or more memory blocks, determining a program-verify voltage offset associated with the program-verify voltage level and the value of the media endurance metric, and performing, using the program-verify voltage level and the program-verify voltage offset, a program-verify operation on the one or more memory blocks.

20 Claims, 10 Drawing Sheets

(56) References Cited

U.S. PATENT DOCUMENTS

| | | | |
|---|---|---|---|
| 2012/0240007 A1* | 9/2012 | Barndt | H03M 13/3707 |
| | | | 714/E11.03 |
| 2016/0307633 A1* | 10/2016 | Lee | G11C 16/3454 |
| 2017/0168716 A1* | 6/2017 | Shaharabany | G06F 3/0679 |
| 2018/0012666 A1* | 1/2018 | Kim | G11C 16/24 |
| 2020/0090760 A1* | 3/2020 | Purahmad | G11C 16/3495 |
| 2022/0359023 A1* | 11/2022 | Wu | G11C 16/3459 |

* cited by examiner

| Trim | Program-Erase Cycle < Q | [Q, R] | [R, S] | [S, T] | Program-Erase Cycle > T |
|---|---|---|---|---|---|
| Wordline Group 0 | Offset 1-1 | Offset 1-2 | Offset 1-3 | Offset 1-4 | Offset 1-5 |
| Wordline Group 1 | Offset 2-1 | Offset 2-2 | Offset 2-3 | Offset 2-4 | Offset 2-5 |
| . | . | . | . | . | . |
| . | . | . | . | . | . |
| Wordline Group N | Offset N-1 | Offset N-2 | Offset N-3 | Offset N-4 | Offset N-5 |
| Read Level 1 | Voffset 1-1 | Voffset 1-2 | Voffset 1-3 | Voffset 1-4 | Voffset 1-5 |
| Read Level 2 | Voffset 2-1 | Voffset 2-2 | Voffset 2-3 | Voffset 2-4 | Voffset 2-5 |
| . | . | . | . | . | . |
| . | . | . | . | . | . |
| Read Level N | Voffset N-1 | Voffset N-2 | Voffset N-3 | Voffset N-4 | Voffset N-5 |

FIG. 5

| Trim | Program-Erase Cycle < Q | [Q, R] | [R, S] | [S, T] | Program-Erase Cycle > T |
|---|---|---|---|---|---|
| Wordline Group 0 | Offset 1-1 | Offset 1-2 | Offset 1-3 | Offset 1-4 | Offset 1-5 |
| Wordline Group 1 | Offset 2-1 | Offset 2-2 | Offset 2-3 | Offset 2-4 | Offset 2-5 |
| . | . | . | . | . | . |
| . | . | . | . | . | . |
| Wordline Group N | Offset N-1 | Offset N-2 | Offset N-3 | Offset N-4 | Offset N-5 |
| Pgm-Verify Level 1 | Voffset 1-1 | Voffset 1-2 | Voffset 1-3 | Voffset 1-4 | Voffset 1-5 |
| Pgm-Verify Level 2 | Voffset 2-1 | Voffset 2-2 | Voffset 2-3 | Voffset 2-4 | Voffset 2-5 |
| . | . | . | . | . | . |
| . | . | . | . | . | . |
| Pgm-Verify Level N | Voffset N-1 | Voffset N-2 | Voffset N-3 | Voffset N-4 | Voffset N-5 |

FIG. 7

MODIFICATION OF PROGRAM VOLTAGE LEVEL WITH READ OR PROGRAM-VERIFY ADJUSTMENT FOR IMPROVING RELIABILITY IN MEMORY DEVICES

CROSS REFERENCE TO RELATED APPLICATIONS

This patent application claims priority of Provisional patent application Ser. No. 63/445,812, titled "MODIFICATION OF PROGRAM VOLTAGE LEVEL WITH READ OR PROGRAM-VERIFY ADJUSTMENT FOR IMPROVING RELIABILITY IN MEMORY DEVICES," filed on Feb. 15, 2023, the entire contents of which is incorporated herein by reference.

TECHNICAL FIELD

Embodiments of the disclosure are generally related to memory sub-systems, and more specifically, are related determining voltage offsets for read and program-verify operations.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some embodiments of the disclosure.

FIG. 5 illustrates a look-up table (LUT) stored in a memory sub-system controller for adjusting program and read voltage offsets based at least on the number of program-erase cycles (PEC) performed on memory blocks of a memory device, in accordance with some embodiments of the present disclosure.

FIG. 7 illustrates a look-up table (LUT) stored in a memory sub-system controller for adjusting program and program-verify voltage offsets based at least on the number of program-erase cycles (PEC) performed on memory blocks of a memory device, in accordance with some embodiments of the present disclosure.

DETAILED DESCRIPTION

Figure 1:
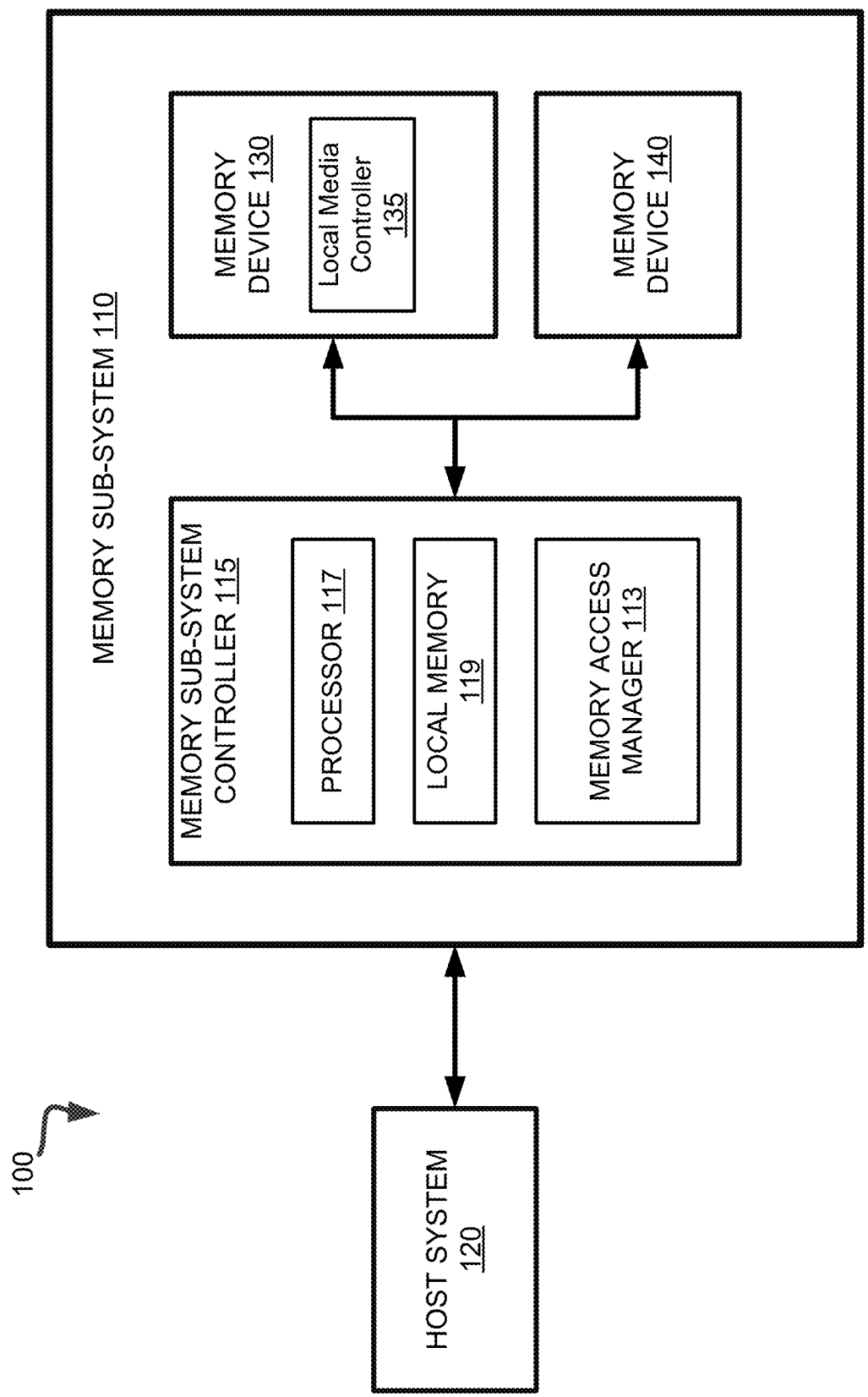
FIG. 1 illustrates an example computing system that includes a memory sub-system in accordance with some embodiments of the present disclosure.

Embodiments of the present disclosure are directed to methods and systems for adjusting voltage offsets of read, program, and program-verify operations based on values of a chosen media endurance metric (e.g., number of program-erase cycles (PEC)) of a memory device. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by not-and (NAND) type flash memory devices. Other examples of non-volatile memory devices are described below in conjunction with FIG. 1. A non-volatile memory device is a package of one or more dies. Each die can consist of one or more planes. Planes can be grouped into logic units (LUN). For some types of non-volatile memory devices (e.g., NAND devices), each plane consists of a set of physical blocks. A "block" herein shall refer to a set of contiguous or non-contiguous memory pages. An example of a "block" is an "erasable block," which is a minimal erasable unit of memory, while "page" is a minimal writable unit of the memory device. Each page includes of a set of memory cells. A memory cell is an electronic circuit that stores information.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data.

The logical address information (e.g., LBA, namespace) can be part of metadata for the host data. Metadata can also include error handling data (e.g., error correction code (ECC), parity code), data version (e.g., used to distinguish age of data written), valid bitmap (which LBAs or logical transfer units contain valid data), etc. For example, upon reading data from a memory device, the memory sub-system controller can perform an error detection and correction operation. The error detection and correction operation includes identifying one or more errors (e.g., bit flip errors) in the read data. The memory sub-system can have the ability to correct a certain number of errors per management unit (e.g., using an error correction code (ECC)). As long as the number of errors in the management unit is within the ECC capability of the memory sub-system, the errors can be corrected before the data is provided to the requestor (e.g., the host system). The fraction of bits that contain incorrect data before applying ECC is called the raw bit error rate (RBER). The fraction of bits that contain incorrect data after applying ECC is called the uncorrectable bit error rate (UBER).

A memory device includes multiple memory cells, each of which can store, depending on the memory cell type, one or more bits of information. A memory cell can be programmed (written to) by applying a certain voltage to the memory cell, which results in an electric charge being held by the memory cell, thus allowing modulation of the voltage distributions produced by the memory cell. Moreover, precisely controlling the amount of the electric charge stored by the memory cell allows the establishment of multiple threshold voltage levels corresponding to different logical levels, thus effectively allowing a single memory cell to store multiple bits of information. For example, a memory cell operated with $2^n$ different threshold voltage levels is capable of storing n bits of information. Thus, the read operation can be performed by comparing the measured voltage exhibited by the memory cell to one or more reference read voltage levels in order to distinguish between two logical levels for single-level cells and between multiple logical levels for multi-level cells. The read reference voltages and the state widths of the threshold voltage distributions determine the edge margins available. The even edges determine the margin for program disturb and over-program, while the odd edges determine the margin for charge loss. The sum of all edge margins is usually defined as the read window budget (RWB). Therefore, a larger window allows larger margins, e.g., to read the cell correctly in the event of charge loss or disturb/over-program.

The reliability of a NAND device, however, decreases with increase in program-erase cycles (PEC). In order to maintain the reliability, some NAND devices employ a step decrease in program voltage based on the number of PEC performed on the memory device. For example, memory blocks with lower number of PEC may employ a larger program voltage offset while memory blocks with higher number of PEC may employ a lower program voltage offset to maintain reliability. Additionally, larger program voltage offsets result in wider threshold voltage distributions and smaller program voltage offset result in tighter threshold voltage distributions, thereby improving reliability of blocks with a high number of PECs. However, this increases the time needed to perform the program operation because more program pulses would be needed to perform the same amount of programming. Additionally, a step decrease in program voltage may also result in an edge sum gain of RWB and lower ideal RBER. For example, the threshold voltage distribution may be aligned at the left edge rather than the center, resulting in even larger edge margin on the left side and slightly smaller edge margin on the right side. This imbalance between even and odd edges may also cause reliability and data retention issues.

Embodiments of the present disclosure address the above-noted and other deficiencies by implementing a memory sub-system that applies a read level adjustment in addition to a step decrease in program voltage associated with a media endurance metric (e.g., the number of PEC) of the memory device. The voltage offset values used for adjusting the read level voltage and/or the program voltage can be stored in the metadata of the memory device, which may be initialized during manufacture of the memory device. In one implementation, the voltage offset values used for adjusting the read level voltage and/or the program voltage can be stored in a look-up table (LUT) that may be stored in the metadata of the memory device. The voltage offset values used for adjusting the read level voltage and/or the program voltage can be determined using threshold voltage (Vt) data that may be collected by performing program operations on the wordlines of the memory device, and generating corresponding threshold voltage (Vt) curves, which may be used to determine the voltage offset values. The values may then be stored in the metadata of the memory device, which may be initialized during the manufacturing process.

In some embodiments, the memory sub-system applies a program-verify level adjustment in addition to a step decrease in program voltage associated with a media endurance metric (e.g., the number of PEC) of the memory device. The voltage offset values used for adjusting the program-verify level voltage and/or the program voltage can be stored in the metadata of the memory device, which may be initialized during manufacture of the memory device. In one implementation, the voltage offset values used for adjusting the program-verify level voltage and/or the program voltage can be stored in a look-up table (LUT) that may be stored in the metadata of the memory device. The voltage offset values used for adjusting the program-verify level voltage and/or the program voltage can be determined using threshold voltage (Vt) data that may be collected by performing one or more program operations on one or more wordlines of the memory device, and generating corresponding threshold voltage (Vt) curves, which may be used to determine the voltage offset values. The values may then be stored in the metadata of the memory device, which may be initialized upon manufacture.

Therefore, advantages of the systems and methods implemented in accordance with some embodiments of the present disclosure include, but are not limited to, improving RBER and reliability for memory blocks with high PECs. The methods disclosed can also improve system performance by reducing folding activities after data retention. The systems and methods disclosed can also slow the process of degradation such that memory blocks reach higher voltage bins slower when compared to the current method of using only step decrease in program voltage.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device (e.g., a processor).

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCS, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

In some implementations, memory sub-system 110 can use a striping scheme, according to which every the data payload (e.g., user data) utilizes multiple dies of the memory devices 130 (e.g., NAND type flash memory devices), such that the payload is distributed through a subset of dies, while the remaining one or more dies are used to store the error correction information (e.g., parity bits). Accordingly, a set of blocks distributed across a set of dies of a memory device using a striping scheme is referred herein to as a "super-block."

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a memory access manager 113, which can be used to implement techniques for applying a read level adjustment in addition to a step decrease in program voltage based on the number of PEC performed on the memory device. In some embodiments, the memory access manager 113 may implement a counter (e.g., a PEC counter), which may be incremented every time a program-erase operation is performed on one or more blocks of the memory device. The counter may be stored in the metadata of the memory device, and may be updated each time a program-erase operation is performed on one or more blocks of the memory device. In some embodiments, the memory access manager 113 may receive a request for performing a program operation on one or more blocks of memory device 130. The memory access manager 113 may then determine, using the counter, the number of PECs that have been performed on the blocks of memory device 130. Depending on the number of PECs, the memory access manager 113 may assign a voltage offset for performing the program operation. In one implementation, the memory access manager 113 may assign a larger program voltage offset to memory blocks with lower number of PECs and assign a lower program voltage offset to memory blocks with larger number of PECs. In some embodiments, the memory access manager 113 may access an offset look-up table (LUT) that may be stored on one or more memory devices 130. In some implementations, at least part of the offset LUT can be cached in the local memory 119 of the memory sub-system controller 115. The offset LUT can be indexed by a trim, which may include one or more blocks sharing a common characteristic (e.g., a wordline group or a voltage bin number), and a record of the offset LUT specifies a read operation threshold voltage offset associated with a media endurance metric (e.g., a number of PECs) of the memory blocks. In one implementation, the offset LUT may categorize memory blocks based on the number of PECs performed on the block. For example, the offset LUT may categorize memory blocks having PECs of less than Q cycles (e.g., 3000 PECs) in a first column of the offset LUT, between Q cycles and R cycles in a second column, between R cycles and S cycles in a third column, between S cycles and T cycles in a fourth column, and some more than T cycles (e.g., 5000 PECs) in a fifth column, and so on and so forth. The memory access manager 113 may use this offset LUT for adjusting program and read voltage offsets in the memory device.

In some embodiments, the memory access manager 113 may receive a request for performing a program operation on one or more blocks of the memory device. The memory access manager 113 may then identify, based on the PEC counter stored in the metadata of the memory device, the number of PECs that have been performed on the blocks of the memory device, and based on the number of PECs, the memory access manager 113 may assign a voltage offset for performing the program operation on a wordline group. The memory access manager 113 may chose a value for the voltage offset from the offset LUT, which may be in the form of a matrix defined by the number of PECs (columns) and the trim (rows). The "trim" may include one or more blocks sharing a common characteristic (e.g., wordline group or voltage bin). In other words, each voltage offset value in the offset LUT is a vector defined by the trim (e.g., wordline group or voltage bin) (row) and the number of PECs (column). The memory access manager 113 may then perform the program operation on the memory blocks of the wordline group 506 using a program voltage adjusted for the voltage offset identified using the offset LUT. For example, if the program voltage is 1.0V and the offset value according to the LUT is –0.5V, then the adjusted program voltage that is used for performing the program operation is 0.5V (1.0V–0.5V). In some embodiments, the memory access manager 113 may, using the LUT, identify a read level associated with a voltage bin of the memory blocks in memory device. Based on the read level of the voltage bin (e.g., Read levels 0-7) and the number of PECs performed on the memory blocks, the memory access manager 113 may assign a read voltage offset (from the LUT) in addition to the program voltage offset.

The memory access manager 113 may then perform the read operation on the memory blocks of memory device using a read voltage adjusted for the assigned read voltage offset.

In some embodiments, the voltage offset values used for adjusting the read level voltage and/or the program voltage can be stored in the metadata of the memory device, which may be initialized during manufacture of the memory device. The voltage offset values can be determined using threshold voltage (Vt) data that may be collected by performing one or more program operations on one or more wordlines of the memory device, and generating corresponding threshold voltage (Vt) curves, which may be used to determine the voltage offset values. The values may then be stored in the metadata of the memory device, which may be initialized upon manufacture.

In one implementation, the read voltage offset may be determined by computing, during or upon manufacture of the memory device, a distance between a first edge of a first threshold voltage distribution valley associated with the voltage bin and a second edge of a subsequent threshold voltage distribution valley, and determining the read voltage offset based on a difference between the read level associated with the voltage bin and a center of the distance between the first edge and the second edge.

In some embodiment, the memory access manager 113 may implement techniques for applying a program-verify level adjustment in addition to a step decrease in program voltage based on the number of PEC performed on the memory device. The memory access manager 113 may receive a request for performing a program operation on one or more blocks of memory device 130. The memory access manager 113 may then determine, using the counter, the number of PECs that have been performed on the blocks of memory device 130. Depending on the number of PECs, the memory access manager 113 may assign a voltage offset for performing the program operation. In some embodiments, the memory access manager 113 may access an offset look-up table (LUT) that may be stored on one or more memory devices 130. In some implementations, at least part of the offset LUT can be cached in the local memory 119 of the memory sub-system controller 115. The offset LUT can be indexed by a trim (e.g., a wordline group or a voltage bin number), and a record of the offset LUT specifies a program-verify operation threshold voltage offset associated with a media endurance metric (e.g., a number of PECs) of the memory blocks. In one implementation, the offset LUT may categorize memory blocks based on the number of PECs performed on the block. The memory access manager 113 may use this offset LUT for adjusting program and program-verify voltage offsets in the memory device.

In some embodiments, the memory access manager 113 may receive a request for performing a program operation on one or more blocks of the memory device. The memory access manager 113 may then identify, based on the PEC counter stored in the metadata of the memory device, the number of PECs that have been performed on the blocks of the memory device, and based on the number of PECs, the memory access manager 113 may assign a voltage offset for performing the program operation on a wordline group. The memory access manager 113 may chose a value for the voltage offset from the offset LUT, which is vectorized by number of PECs and the trim (e.g., wordline group or voltage bin). In other words, each voltage offset value in the offset LUT is a vector defined by the trim (e.g., wordline group or voltage bin) and the number of PECs. The memory access manager 113 may then perform the program operation on the memory blocks of the wordline group 506 using a program voltage adjusted for the voltage offset identified using the offset LUT. In some embodiments, the memory access manager 113 may, using the LUT, identify a program-verify level associated with a voltage bin of the memory blocks in memory device. Based on the program-verify level of the voltage bin (e.g., Program-verify levels 0-7) and the number of PECs performed on the memory blocks, the memory access manager 113 may assign a program-verify voltage offset in addition to the program voltage offset. The memory access manager 113 may then perform the program-verify operation on the memory blocks of memory device using a program-verify voltage adjusted for the assigned program-verify voltage offset.

In some embodiments, the voltage offset values used for adjusting the program-verify level voltage and/or the program voltage can be stored in the metadata of the memory device, which may be initialized during manufacture of the memory device. The voltage offset values can be determined using threshold voltage (Vt) data that may be collected by performing one or more program operations on one or more wordlines of the memory device, and generating corresponding threshold voltage (Vt) curves, which may be used to determine the voltage offset values. The values may then be stored in the metadata of the memory device, which may be initialized upon manufacture. In one implementation, the program-verify voltage offset can be determined by aligning a first center of a first threshold voltage distribution valley applying the program voltage offset with a second center of the first threshold voltage distribution valley without applying the program voltage offset, and determining the program-verify voltage offset based on a difference between the program-verify voltage level associated with the voltage bin and a second edge of the first threshold voltage distribution valley applying the program voltage offset.

Figure 2:
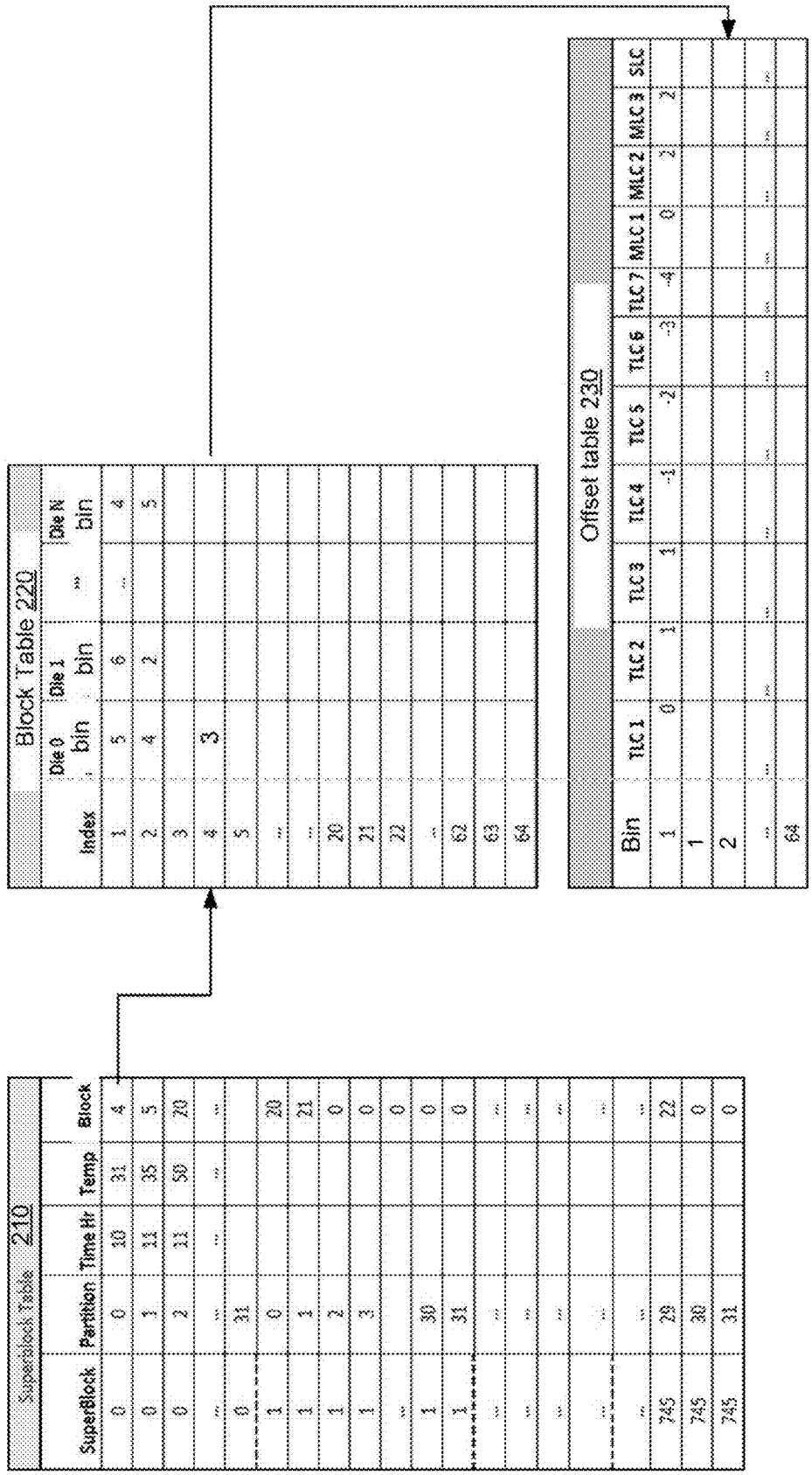
FIG. 2 schematically illustrates example metadata maintained by the memory sub-system controller for associating blocks with voltage bins, in accordance with embodiments of the present disclosure.

FIG. 2 schematically illustrates example metadata maintained by the memory sub-system controller 115 for associating blocks and/or partitions with voltage bins, in accordance with embodiments of the present disclosure. As schematically illustrated by FIG. 2, the memory sub-system controller can maintain the superblock table 210, the block table 220, and the offset table 230. Each record of the superblock table 210 specifies the block associated with the specified superblock and partition combination. In some implementations, the superblock table records can further include time and temperature values associated with the specified superblock and partition combination.

The block table 220 is indexed by the block number, such that each record of the block table 220 specifies, for the block referenced by the index of the record, a set of voltage bins associated with respective dies of the block. In other words, each record of the block table 220 includes a vector, each element of which specifies the voltage bin associated with the die referenced by the index of the vector element.

Finally, the offset table 230 is indexed by the bin number. A record of the offset table 230 specifies a set of read operation threshold voltage offsets (e.g., for TLC, MLC, and/or SLC) associated with a voltage bin. Another record specifies a set of bin determination threshold voltage offsets (e.g., for TLC, MLC, and/or SLC) associated with the voltage bin. The metadata tables 210-230 can be stored on one or more memory devices 130 of FIG. 1. In some implementations, at least part of the metadata tables can be cached in the local memory 119 of the memory sub-system controller 115 of FIG. 1.

In operation, upon receiving a read command, the memory sub-system controller determines the physical address corresponding to the logical block address (LBA) specified by the read command. Components of the physical address, such as the physical block number and the die identifier, are utilized for performing the metadata table walk: first, the superblock table 210 is used to identify the block identifier corresponding to the physical block number; then, the block identifier is used as the index to the block table 220 in order to determine the voltage bin associated with the block and the die; finally, the identified voltage bin is used as the index to the offset table 230 in order to determine the read operation threshold voltage offset and the bin determination threshold voltage offset corresponding to the bin. The memory sub-system controller can then additively apply the identified read operation threshold voltage offset to the base voltage read level in order to perform the requested read operation.

In the illustrative example of FIG. 2, the superblock table 210 maps partition 0 of the superblock 0 to block 4, which is utilized as the index to the block table 220 in order to determine that die 0 is mapped to voltage bin 3. The latter value is used as the index to the offset table in order to determine the threshold voltage offset values for voltage bin 3.

Figure 3:
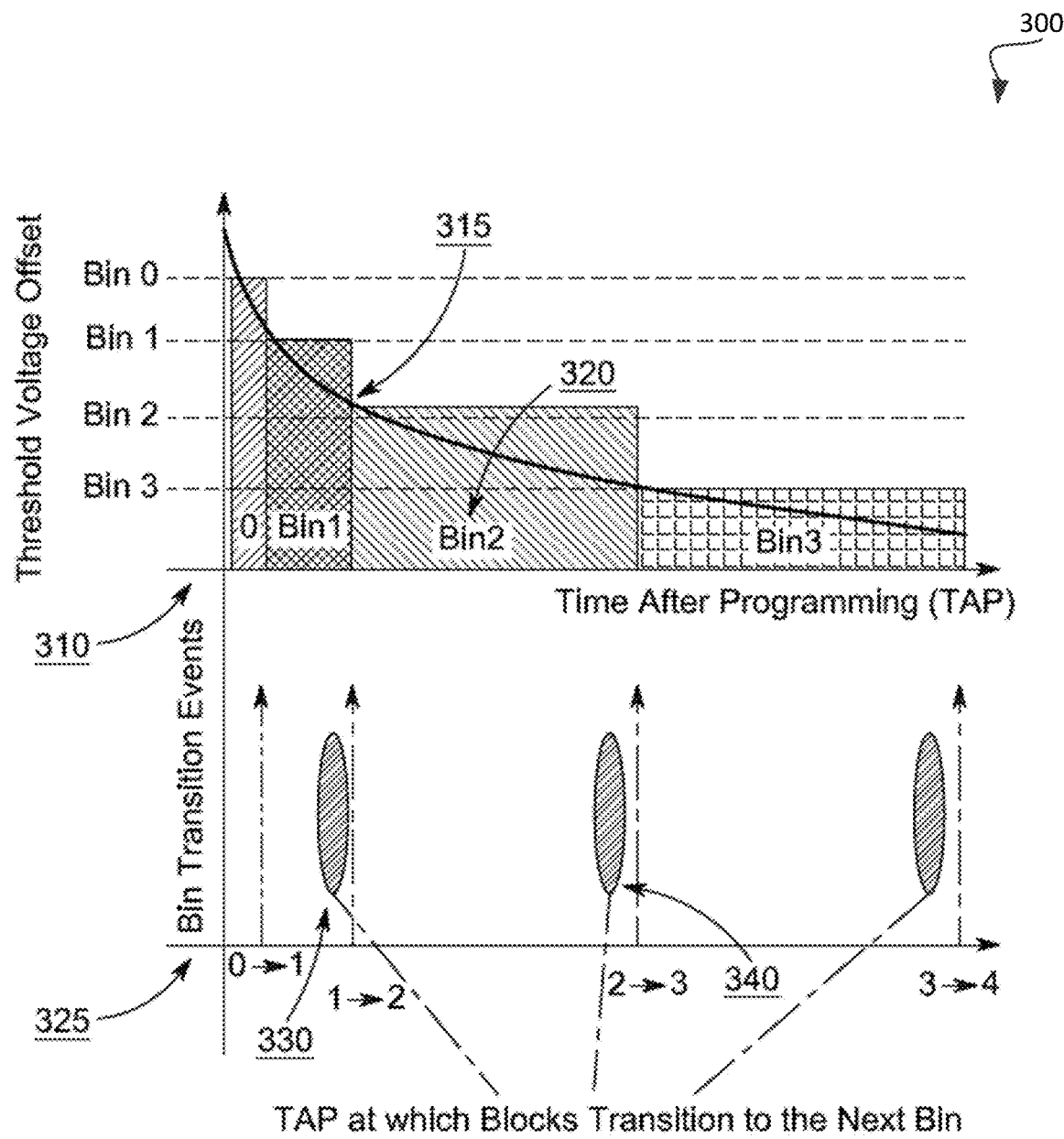
FIG. 3 illustrates an example method of calibrating voltage bins of a memory device based on threshold voltage offset of blocks approaching a transition boundary between voltage bins, in accordance with one or more aspects of the present disclosure.

FIG. 3 illustrates an example method of calibrating voltage bins of a memory device based on threshold voltage offset of blocks approaching a transition boundary between voltage bins, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. In some embodiments, the method 300 is performed by memory access manager 113 of FIG. 1. In one implementation, graph 310 schematically illustrates a set of voltage bins (e.g., bin 0 to bin 3), in accordance with embodiments of the present disclosure for a selected read level. Threshold voltage offset curve 315 illustrates the dependency of the threshold voltage offset, on the y-axis, on the time after program (which can be time normalized with respect to a particular temperature), the period of time elapsed since the block had been programmed, on the x-axis for the selected read level. In one implementation, blocks of the memory device that have been programmed within a specified time window are assigned to a voltage bin that corresponds to the time after program of the blocks. As noted herein above, given that wear-leveling can keep program/erase cycles similar on all blocks, the time elapsed after programming and temperature of the memory device are the main factors affecting the temporal voltage shift. Using normalized time takes into account the temperature profile and hence temperature information is incorporated. Accordingly, all blocks programmed within a specific time window (i.e., normalized time window) are presumed to exhibit similar distributions of threshold voltages in memory cells, and thus can be assigned to the same voltage bin and can utilize the same voltage offsets for read operations.

In one implementation, a newly programmed block can be associated with bin 0. Then, the memory sub-system controller can periodically perform a foreground or background calibration process in order to associate each die of every block with one of the predefined threshold voltage bins (e.g., bins 0-3 in the illustrative example of FIG. 3), which is in turn associated with the voltage offsets to be applied for read operations. The associations of blocks with voltage bins and dies can be stored in respective metadata tables maintained by the memory sub-system controller, as explained in more details herein with respect to FIG. 2. The threshold voltage offset of FIG. 3 are associated with a single valley. The threshold voltage offset value become more negative going down the y-axis, which corresponds to higher SCL. For each voltage bin, a separate threshold voltage offset can be assigned to each valley.

As schematically illustrated by FIG. 3, graph 310 can be subdivided into multiple voltage bins 320, such that each voltage bin corresponds to a predetermined range of threshold voltage offsets based on a corresponding range of TAP of the voltage bin. While the illustrative example of FIG. 3 defines four voltage bins, in other implementations, various other numbers of voltage bins can be employed (e.g., 7 bins or even 10 bins). Based on a periodically performed calibration process, the memory sub-system controller associates each die of every block with a voltage bin, which defines a set of threshold voltage offsets to be applied to the base voltage read level in order to perform read operations of data of the block, as described in more detail herein below.

Graph 325 of FIG. 3 illustrates the process of calibrating voltage bins by assigning a threshold voltage offset to a voltage bin based on a threshold voltage offset of blocks approaching a transition boundary between voltage bins. In an implementation, a processing logic executing method 300 can determine a time after program (TAP) 330 corresponding to a transition boundary between bin 1 and bin 2. In an implementation, TAP 330 can be a specific value of time elapsed since programming a block. In other implementations, TAP 330 can be a range of values, such that a block having a TAP value that is within the TAP 330 range can be transitioned from voltage bin 1 to voltage bin 2.

In certain implementations, the processing logic can determine a set of blocks assigned to voltage bin 1 that are approaching boundary TAP 330 between voltage bin 1 and voltage bin 2. As an example, the processing logic can determine the set of blocks having a TAP value that is within a predetermined distance from TAP 330. When the set of blocks approaching the transition boundary corresponding to TAP 330 are determined, the processing logic can determine a threshold voltage offset that is efficient for read operations of the determined set of blocks, to be used as an initial threshold voltage offset for the selected read level of voltage bin 2. In an implementation, a set of efficient threshold voltage offsets (one for each valley) of the set of blocks can be determined by performing read operations of data stored at the set of blocks and determining a set of threshold voltage offsets that result in a minimum bit error rate of the read operations. When the set of threshold voltage offsets of the set of blocks is determined, the processing logic can assign the determined threshold voltage offset set as an initial value of the threshold voltage offsets of the selected read level of voltage bin 2. In an implementation, the processing logic can then assign blocks to voltage bin 2 and can utilize the initial value of the threshold voltage offsets to perform read operations of the newly assigned blocks that are associated with the selected read level. For each voltage bin, the set of read offsets includes one offset per valley, such as 7 offsets for TLC wordlines, for example. Page reads correspond to different valleys and as such can use corresponding read offsets. Read operations used to determine the set of read offsets can use different page types to cover all valleys.

Similarly, the processing logic can determine a TAP 340 corresponding to a transition boundary between voltage bin 2 and voltage bin 3. In an implementation, TAP 340 can be a specific value of time elapsed since programming a block. In other implementations, TAP 340 can be a range of values, such that a block having a TAP value that is within the TAP 340 range can be transitioned from voltage bin 2 to voltage bin 3. In certain implementations, the processing logic can determine a set of blocks assigned to voltage bin 2 that are approaching boundary TAP 340 between voltage bin 2 and voltage bin 3. As an example, the processing logic can determine the set of blocks having a TAP value that is within a predetermined distance from TAP 340. When the set of blocks approaching the transition boundary corresponding to TAP 340 are determined, the processing logic can determine a set of threshold voltage offsets that are efficient for read operations of the determined set of blocks, to be used as an initial set of threshold voltage offsets for the selected read level of voltage bin 3. When the se of threshold voltage offsets of the set of blocks is determined, the processing logic can assign the determined threshold voltage offset set as an initial value of the threshold voltage offset of the selected read level of voltage bin 3. In an implementation, the processing logic can then assign blocks to voltage bin 3 and can utilize the initial values of the threshold voltage offset to perform read operations of the newly assigned blocks that are associated with the selected read level.

Figure 4:
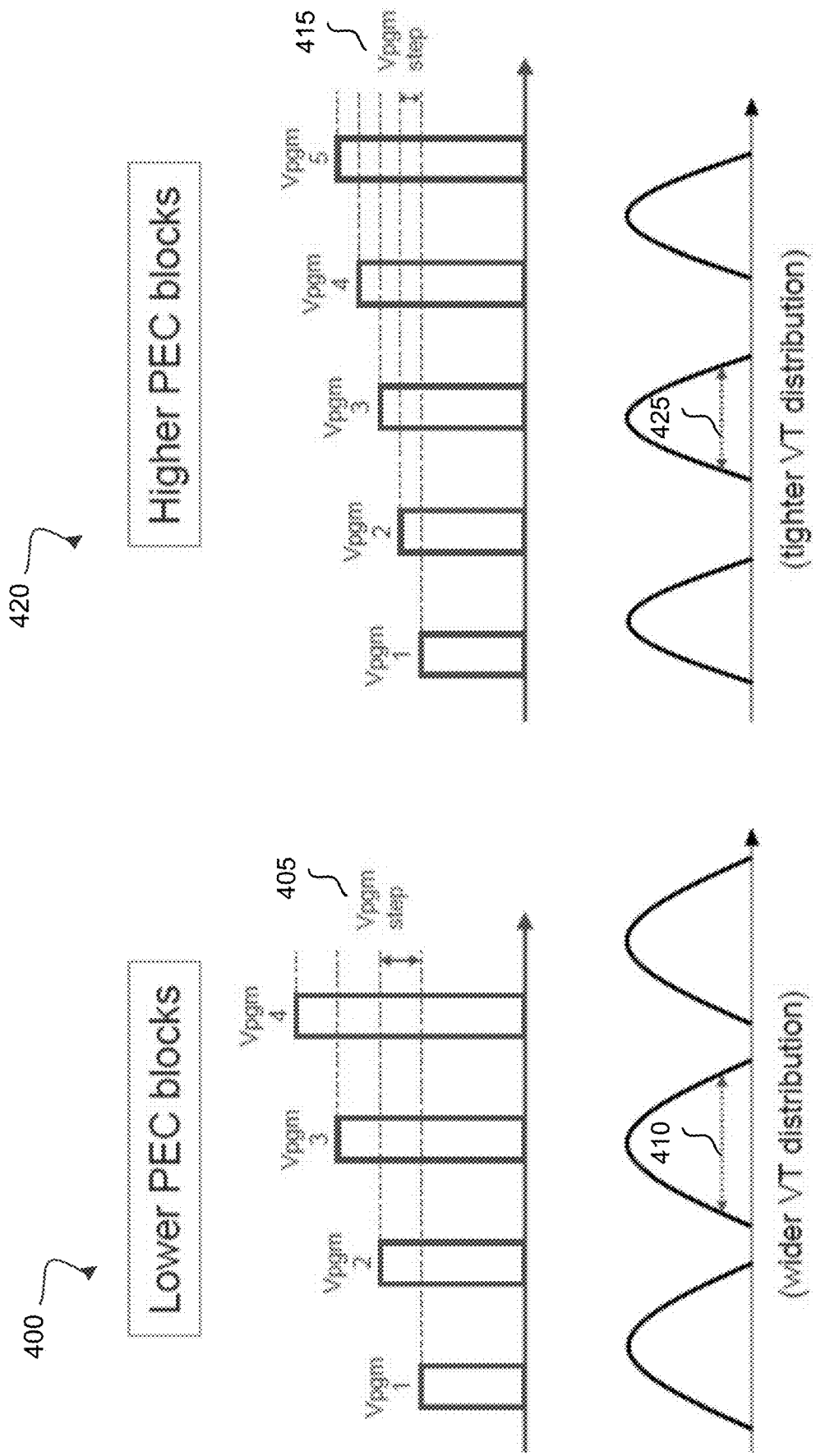
FIG. 4 schematically illustrates a method for adjusting a program voltage based on the number of program-erase cycles (PEC) performed on memory blocks of a memory device, in accordance with one or more aspects of the present disclosure.

FIG. 4 illustrates example methods 400, 420 for adjusting program voltage based on the number of PECs performed on the memory device, in accordance with one or more aspects of the present disclosure. Methods 400, 420 may be performed by processing logic that includes hardware (e.g., circuitry, dedicated logic, programmable logic, microcode, etc.), software (e.g., instructions run on a processor to perform hardware simulation), or a combination thereof. In some embodiments, methods 400, 420 are performed by the memory access manager 113 of FIG. 1. In one implementation, the method 400, 420 may include using a counter that may be incremented every time a program-erase operation (e.g., program-erase cycle (PEC)) is performed on one or more memory blocks of the memory device. The method 400 may further include assigning a program voltage offset 405 depending on the number of PECs already performed on the memory device. For example, blocks with low number of PECs (e.g., 3000 PEC or less) may be assigned a higher program voltage offset 405. Similarly, in method 420, blocks with high number of PECs (e.g., more than 3000 PEC) may be assigned a smaller program voltage offset 415. As illustrated in FIG. 4, blocks with lower number of PECs tend to have wider threshold voltage (Vt) distributions 410, and blocks with higher number of PECs tend to have tighter threshold voltage (Vt) distributions 425. The program level adjustment can be determined using threshold voltage (Vt) data collected by performing one or more program operations on one or more wordlines or a portion of a wordline, and generating corresponding threshold voltage (Vt) curves. This process may be repeated several times over one or more wordlines in order to gather sufficient threshold voltage data, generate the threshold voltage distributions, and arrive at the voltage offset values.

FIG. 5 illustrates an offset look-up table (LUT) 500, stored in the metadata of the memory device, for adjusting program and read voltage offsets based at least on the number of program-erase cycles (PEC) performed on memory blocks of a memory device, in accordance with some embodiments of the present disclosure. The offset LUT 500 may be vectorized by number of PECs 504 and the trim 502 (e.g., wordline group or voltage bin). In other words, each voltage offset value 508 in the offset LUT 500 is a vector defined by the trim 502 (e.g., wordline group or voltage bin) and the number of PECs 504. The LUT 500 may categorize the memory blocks based on the number of PECs 504. For example, the LUT 500 may include memory blocks with PECs of less than Q (e.g., 3000) PECs, between Q and R, between R and S, between S and T, and some more than T (e.g., 5000) PECs. The memory sub-system controller may use this LUT for adjusting program and read voltage offsets in the memory device. In some embodiments, the memory access manager 113 may receive a request for performing a program operation on one or more blocks of the memory device. The memory access manager 113 may then identify the number of PECs 504 that have been performed on the blocks of memory device. Based on the number of PECs 504, the memory access manager 113 may assign a voltage offset 508 for performing the program operation on a wordline group 506. For example, the memory access manager 113 may assign a larger program voltage offset to memory blocks of a wordline group with lower number of PECs and assign a lower program voltage offset to memory blocks of a wordline group with larger number of PECs. The memory access manager 113 may then perform the program operation on the memory blocks of the wordline group 506 using a program voltage adjusted for the assigned program voltage offset 508.

In some embodiments, the memory access manager 113 may, using the LUT 500, identify a read level 510 associated with a voltage bin of the memory blocks in memory device. Based on the read level 510 of the voltage bin (e.g., Read levels 0-7) and the number of PECs 504 performed on the memory blocks, the memory access manager 113 may assign a read voltage offset 512 in addition to the program voltage offset 508. The memory access manager 113 may then perform the read operation on the memory blocks of memory device using a read voltage adjusted for the assigned read voltage offset 512.

Figure 6A:
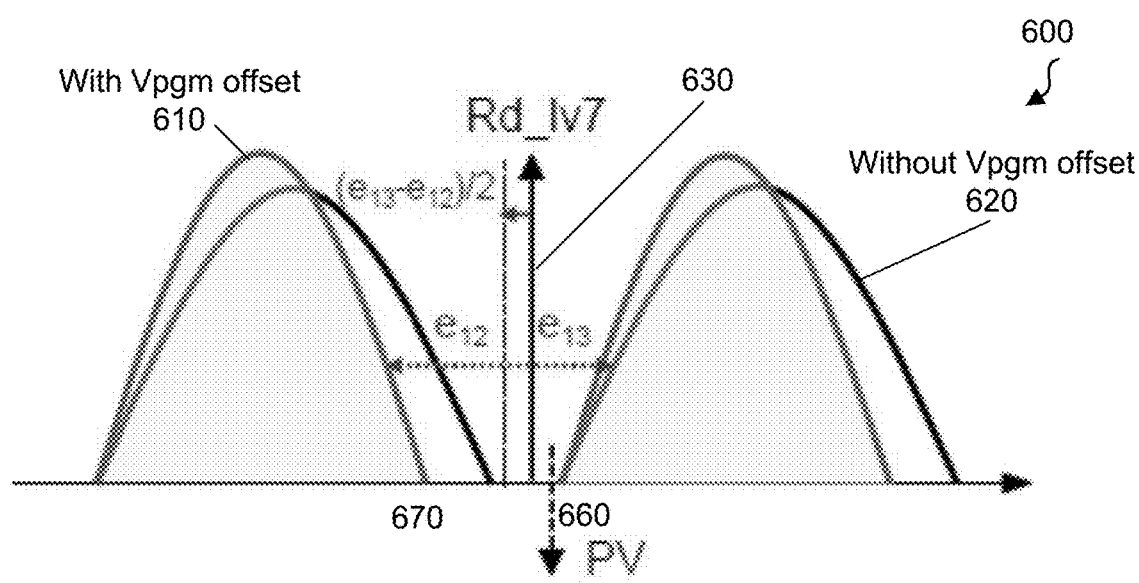
FIGS. 6A and 6B illustrate example operations in a method for determining a voltage offset for performing a read operation on memory blocks of a memory device, in accordance with one or more aspects of the present disclosure.

FIG. 6A illustrates example operations in a method 600 for determining a voltage offset for performing a program operation on memory blocks of a memory device, in accordance with one or more aspects of the present disclosure. The curves illustrated in FIGS. 6A and 6B and the voltage offset values used for adjusting the read level voltage and/or the program voltage can be stored in the metadata of the memory device, which may be initialized during manufacture of the memory device. The voltage offset values can be determined using threshold voltage (Vt) data that may be collected by performing one or more program operations on one or more wordlines of the memory device, and generating corresponding threshold voltage (Vt) curves, which may be used to determine the voltage offset values. The values may then be stored in the metadata of the memory device, which may be initialized upon manufacture. In one implementation, method 600 includes generating threshold voltage distribution valleys 610 using a program voltage offset (e.g., offset 508), and generating threshold voltage distribution valleys 620 without using a program voltage offset (e.g., offset 508). First valley 610 has a first edge 670 and a second edge, and second valley 610 has a first edge and a second edge 660. However, when only a program voltage offset is used, the read level voltage 630 is not synchronized with the program level voltage change. As a result, the margin $e_{12}$ increases on one side of the read level and margin $e_{13}$ shrinks on the other side of the read level. This may cause reliability and date retention issued in the memory device.

Figure 6B:
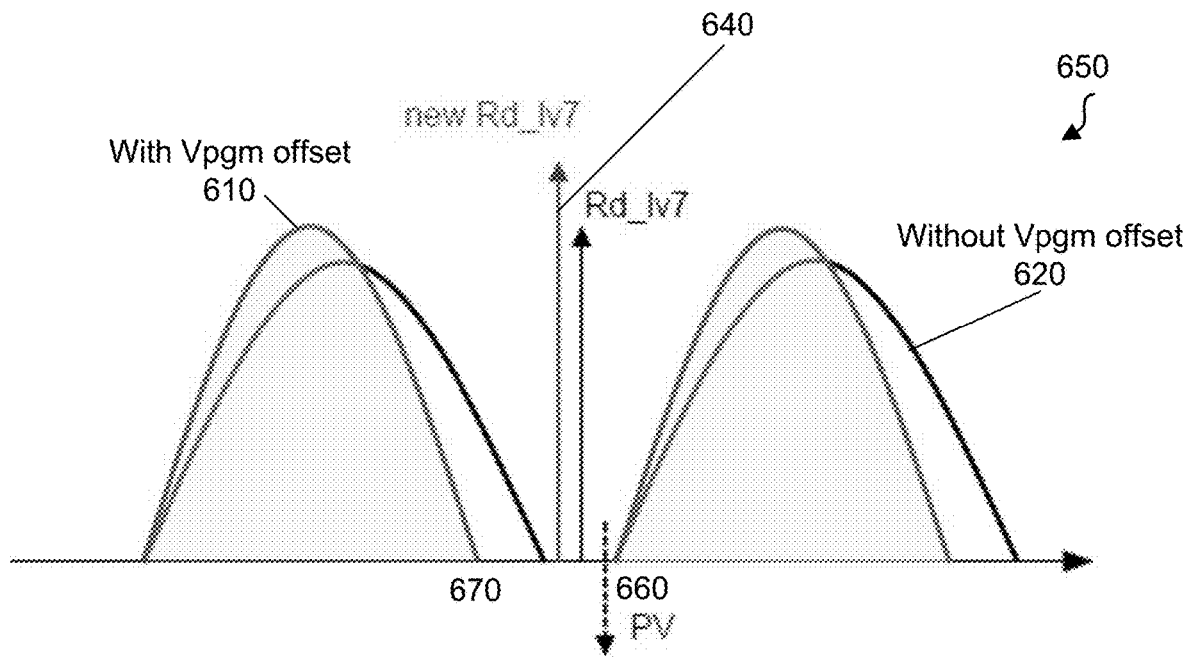

FIG. 6B illustrates example operations in a method 650 for determining a voltage offset for performing a read operation on memory blocks of a memory device, in accordance with one or more aspects of the present disclosure. The method 650 includes determining a new read voltage level 640 based on an offset (e.g., $e_{12}+e_{13}/2$) that is the average of the margin $e_{12}$ on one side of the read level and margin $e_{13}$ on the other side of the read level 630. For example, the memory access manager 113 may determine a distance between a first edge 670 of a first threshold voltage distribution valley 610 associated with the voltage bin and a second edge 660 of a subsequent threshold voltage distribution valley 610. The read voltage offset may be determined based on a difference between the read level 630 associated with the voltage bin and a center of the distance between the first edge 670 and the second edge 660.

FIG. 7 illustrates an offset look-up table (LUT) 700, stored in the metadata of the memory device, for adjusting program and program-verify voltage offsets based at least on the number of program-erase cycles (PEC) 704 performed on memory blocks of a memory device, in accordance with some embodiments of the present disclosure. The offset LUT 700 may be vectorized by number of PECs 704 and the trim 702 (e.g., wordline group or voltage bin). In other words, each voltage offset value 708 in the offset LUT 700 is a vector defined by the trim 702 (e.g., wordline group or voltage bin) and the number of PECs 704. The LUT 500 may include details of a trim 702, which may include a wordline group or a voltage bin number. The LUT 700 may categorize the memory blocks based on the number of PECs 704. For example, the LUT 700 may include memory blocks with PECs of less than Q (e.g., 3000) PECs, between Q and R, between R and S, between S and T, and some more than T (e.g., 5000) PECs. The memory sub-system controller may use this LUT 700 for adjusting program and program-verify voltage offsets in the memory device. In some embodiments, the memory access manager 113 may receive a request for performing a program operation on one or more blocks of the memory device. The memory access manager 113 may then identify the number of PECs 704 that have been performed on the blocks of memory device. Based on the number of PECs 704, the memory access manager 113 may assign a voltage offset 708 for performing the program operation on a wordline group 706. The memory access manager 113 may then perform the program operation on the memory blocks of the wordline group 706 using a program voltage adjusted for the assigned program voltage offset 708.

In some embodiments, the memory access manager 113 may, using the LUT 700, identify a program-verify level 710 associated with a voltage bin of the memory blocks in memory device. Based on the program-verify level 710 of the voltage bin (e.g., Read levels 0-7) and the number of PECs 704 performed on the memory blocks, the memory access manager 113 may assign a program-verify voltage offset 712 in addition to the program voltage offset 708. The memory access manager 113 may then perform the program-verify operation on the memory blocks of memory device using a read voltage adjusted for the assigned read voltage offset 712.

Figure 8A:
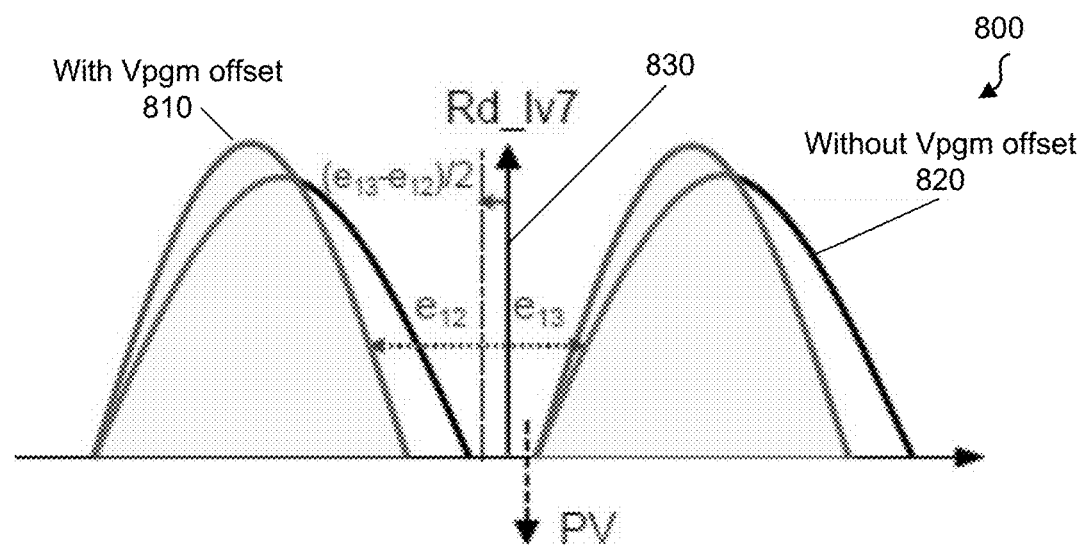
FIGS. 8A and 8B illustrate example operations in a method for determining a voltage offset for performing a program-verify operation on memory blocks of a memory device, in accordance with one or more aspects of the present disclosure.

FIG. 8A illustrates example operations in a method 800 for determining a voltage offset for performing a program-verify operation on memory blocks of a memory device, in accordance with one or more aspects of the present disclosure. The curves illustrated in FIGS. 8A and 8B and the voltage offset values used for adjusting the program-verify level voltage and/or the program voltage can be stored in the metadata of the memory device, which may be initialized during manufacture of the memory device. The voltage offset values can be determined using threshold voltage (Vt) data that may be collected by performing one or more program operations on one or more wordlines of the memory device, and generating corresponding threshold voltage (Vt) curves, which may be used to determine the voltage offset values. The values may then be stored in the metadata of the memory device, which may be initialized upon manufacture. In one implementation, the method 800 includes generating threshold voltage distribution valleys 810 using a program voltage offset (e.g., offset 508), and generating threshold voltage distribution valleys 820 without using a program voltage offset (e.g., offset 508). First valley 810 has a first edge 870 and a second edge, and second valley 810 has a first edge and a second edge 880. However, when only a program voltage offset is used, the read level voltage 830 is not synchronized with the program level voltage change. As a result, the margin $e_{12}$ increases on one side of the read level and margin $e_{13}$ shrinks on the other side of the read level. This may cause reliability and date retention issued in the memory device.

Figure 8B:
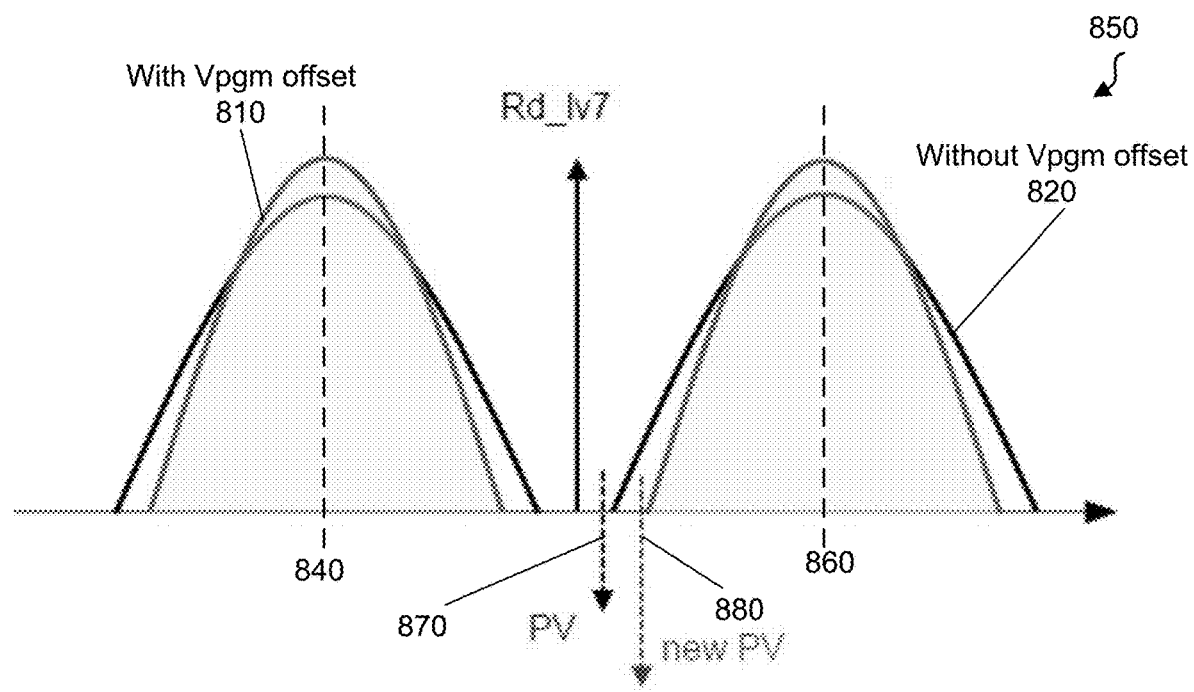

FIG. 8B illustrates example operations in a method 850 for determining a voltage offset for performing a read operation on memory blocks of a memory device, in accordance with one or more aspects of the present disclosure. The method 850 includes determining a new program-verify voltage level 880 by aligning a center 840 of a threshold voltage distribution valley 810 applying the program voltage offset with a center of the threshold voltage distribution valley 820 without applying the program voltage offset. Similarly, the method 850 may include determining the new program-verify voltage level 880 by aligning a center 860 of a threshold voltage distribution valley 810 applying the program voltage offset with a center of the threshold voltage distribution valley 820 without applying the program voltage offset. The method 850 further includes determining the program-verify voltage offset 880 based on a difference between the program-verify voltage level 870 associated with the voltage bin and a second edge of the first threshold voltage distribution valley 810 applying the program voltage offset. Since the earlier program-verify level is associated with the threshold voltage distribution valley 820 without applying the program voltage offset, it would now be moved to 880 so the program-verify voltage level is in line with the edge of the threshold voltage distribution valley 810 applying the program voltage offset.

Figure 9:
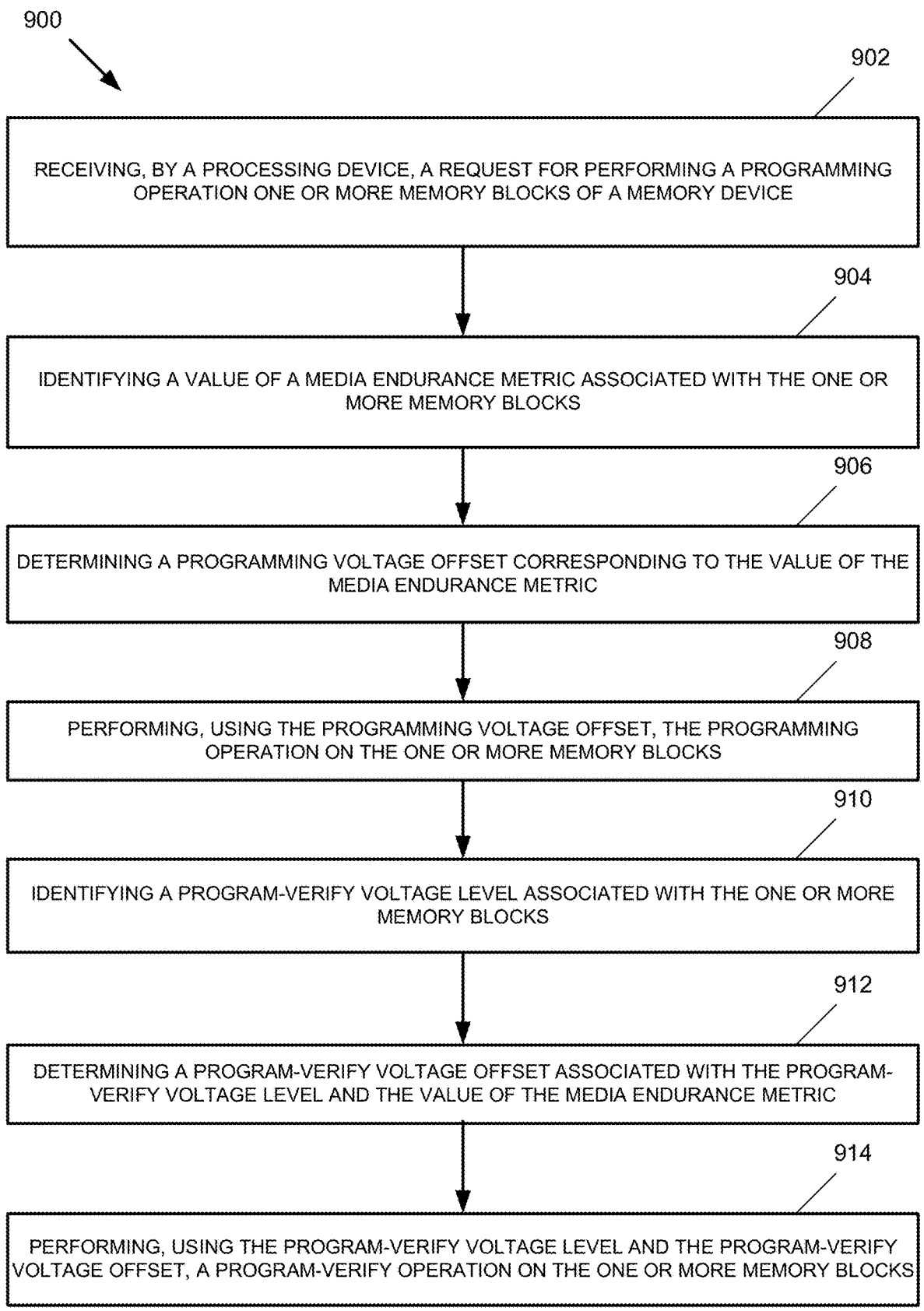
FIG. 9 is a flow diagram of an example method for adjusting voltage offsets of read, program, and program-verify operations performed on memory blocks of a memory device, in accordance with one or more aspects of the present disclosure.

FIG. 9 is a flow diagram of an example method 900 for adjusting voltage offsets of read, program, and program-verify operations performed on memory blocks of a memory device, in accordance with one or more aspects of the present disclosure. The method 900 can be performed by a processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the memory access manager 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 902, the processing logic may receive a request from a host system (e.g., host system 120) for performing a program operation on one or more blocks of the memory device. At operation 904, the processing logic may identify the number of PECs (e.g., PECs 504, 704) that have been performed on the blocks of memory device. Depending on the number of PECs, the processing logic may, at operation 906, assign a voltage offset (e.g., offset 508, 708) for performing the program operation on a wordline group (e.g., wordline group 506, 706). For example, the processing logic may assign a larger program voltage offset to memory blocks of a wordline group with lower number of PECs and assign a lower program voltage offset to memory blocks of a wordline group with larger number of PECs. At operation 908, the processing logic may perform the program operation on the memory blocks of the wordline group using a program voltage adjusted for the assigned program voltage offset. At operation 910, the processing logic may, using a LUT, identify a read level associated with a voltage bin of the memory blocks in memory device. At operation 912, based on the read level of the voltage bin (e.g., Read levels 0-7) and the number of PECs performed on the memory blocks, the processing logic may assign a read voltage offset in addition to the program voltage offset. At operation 914, the processing logic may then perform the read operation on the memory blocks of memory device using a read voltage adjusted for the assigned read voltage offset.

The method may further include determining a new read voltage level based on an offset (e.g., $e_{12}+e_{13}/2$) that is the average of the margin $e_{12}$ on one side of the read level (e.g., read level 630) and margin $e_{13}$ on the other side of the read level. For example, the processing logic may determine a distance between a first edge (e.g., edge 670) of a first threshold voltage distribution valley (e.g., valley 610) associated with the voltage bin and a second edge (e.g., edge 660) of a subsequent threshold voltage distribution valley (e.g., valley 610). The read voltage offset may be determined based on a difference between the read level associated with the voltage bin and a center of the distance between the first edge and the second edge.

In some embodiments, the processing logic may, using a LUT, identify a program-verify level associated with a voltage bin of the memory blocks in memory device. Depending on the program-verify level of the voltage bin (e.g., Read levels 0-7) and the number of PECs performed on the memory blocks, the processing logic may assign a program-verify voltage offset in addition to the program voltage offset. The processing logic may then perform the program-verify operation on the memory blocks of memory device using a read voltage adjusted for the assigned read voltage offset.

Method 900 may include determining a new program-verify voltage level (e.g., level 880) by aligning a center (e.g., center 840) of a threshold voltage distribution valley (e.g., valley 810) applying the program voltage offset with a center of the threshold voltage distribution valley (e.g., valley 820) without applying the program voltage offset. The method 900 may further include determining the program-verify voltage offset (e.g., 880) based on a difference between the program-verify voltage level associated with the voltage bin and a second edge of the first threshold voltage distribution valley applying the program voltage offset. Since the earlier program-verify level is associated with the threshold voltage distribution valley without applying the program voltage offset, it would now be moved so the program-verify voltage level is in line with the edge of the threshold voltage distribution valley applying the program voltage offset.

Figure 10:
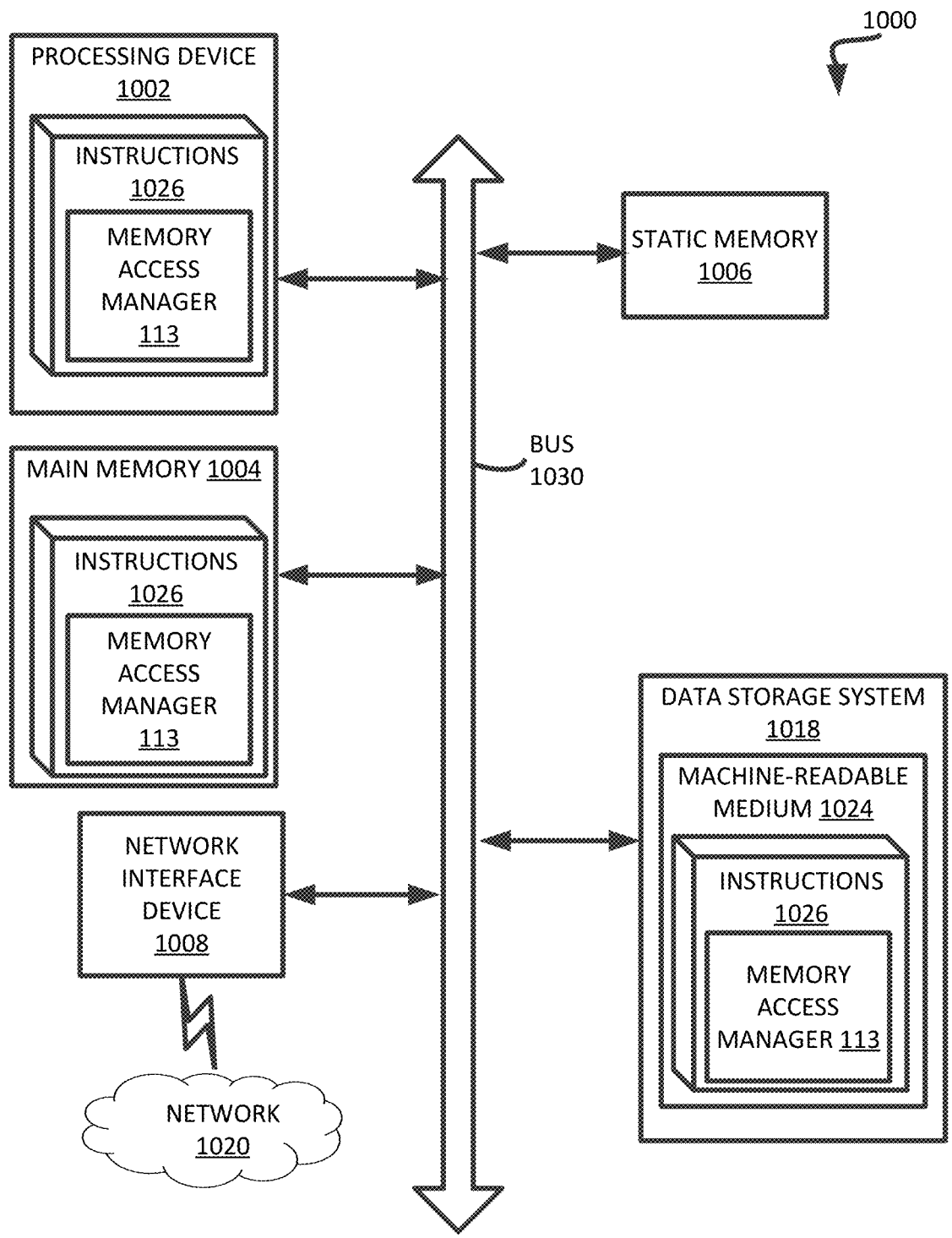
FIG. 10 illustrates an example machine of a computer system within which a set of instructions, for causing the machine to perform any one or more of the methodologies discussed herein, can be executed.

FIG. 10 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to memory access manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations discussed herein. The computer system 1000 can further include a network interface device 1008 to communicate over the network 1020.

The data storage system 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIG. 1.

In one embodiment, the instructions 1026 include instructions to implement functionality corresponding to memory access manager 113 of FIG. 1. While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving, by a processing device, a request for performing a programming operation on one or more memory blocks of a memory device;
identifying a value of a media endurance metric associated with the one or more memory blocks;
determining a programming voltage offset corresponding to the value of the media endurance metric;
performing, using the programming voltage offset, the programming operation on the one or more memory blocks;
identifying a program-verify voltage level associated with the one or more memory blocks;
determining a program-verify voltage offset associated with the program-verify voltage level and the value of the media endurance metric; and
performing, using the program-verify voltage level and the program-verify voltage offset, a program-verify operation on the one or more memory blocks.

2. The method of claim 1, wherein the media endurance metric reflects a number of program-erase cycles performed on the one or more memory blocks.

3. The method of claim 1, further comprising:
identifying a read voltage level associated with the one or more memory blocks;
determining a read voltage offset associated with the read voltage level and the value of the media endurance metric; and
performing, using the read voltage level and the read voltage offset, a read operation on the one or more memory blocks.

4. The method of claim 1, wherein identifying the value of the media endurance metric associated with the one or more memory blocks further comprises:
accessing a program-erase counter stored in a metadata of the memory device; and identifying, based on a value of the program-erase counter, a number of program-erase operations performed on the one or more memory blocks.

5. The method of claim 1, wherein determining the programming voltage offset corresponding to the value of the media endurance metric further comprises:
   identifying, in a look-up table, a record mapping a wordline group and the value of the media endurance metric to the programming voltage offset.

6. The method of claim 1, wherein determining the program-verify voltage offset further comprises:
   accessing an offset look-up table stored in a metadata of the memory device;
   identifying a voltage bin associated with the one or more memory blocks; and
   determining the program-verify voltage offset corresponding to the voltage bin and the value of the media endurance metric.

7. The method of claim 3, wherein determining the read voltage offset further comprises:
   accessing an offset look-up table stored in a metadata of the memory device;
   identifying a voltage bin associated with the one or more memory blocks; and
   determining the read voltage offset corresponding to the voltage bin and the value of the media endurance metric.

8. A system comprising:
   a memory device; and
   a processing device, operatively coupled with the memory device, to perform operations comprising:
   identifying a value of a media endurance metric associated with the one or more memory blocks of the memory device;
   determining a programming voltage offset corresponding to the value of the media endurance metric;
   performing, using the programming voltage offset, a programming operation on the one or more memory blocks;
   identifying a program-verify voltage level associated with the one or more memory blocks;
   determining a program-verify voltage offset associated with the program-verify voltage level and the value of the media endurance metric; and
   performing, using the program-verify voltage level and the program-verify voltage offset, a program-verify operation on the one or more memory blocks.

9. The system of claim 8, wherein the media endurance metric reflects a number of program-erase cycles performed on the one or more memory blocks.

10. The system of claim 8, wherein the operations further comprise:
    identifying a read voltage level associated with the one or more memory blocks;
    determining a read voltage offset associated with the read voltage level and the value of the media endurance metric; and
    performing, using the read voltage level and the read voltage offset, a read operation on the one or more memory blocks.

11. The system of claim 8, wherein identifying the value of the media endurance metric associated with the one or more memory blocks further comprises:
    accessing a program-erase counter stored in a metadata of the memory device; and
    identifying, based on the value of the program-erase counter, a number of program-erase operations performed on the one or more memory blocks.

12. The system of claim 8, wherein determining the programming voltage offset corresponding to the value of the media endurance metric further comprises:
    accessing an offset look-up table stored in a metadata of the memory device;
    identifying a wordline group associated with the one or more memory blocks; and
    determining the programming voltage offset corresponding to the wordline group and the value of the media endurance metric.

13. The system of claim 8, wherein determining the program-verify voltage offset further comprises:
    accessing an offset look-up table stored in a metadata of the memory device;
    identifying a voltage bin associated with the one or more memory blocks; and
    determining the program-verify voltage offset corresponding to the voltage bin and the value of the media endurance metric.

14. The system of claim 10, wherein determining the read voltage offset further comprises:
    accessing an offset look-up table stored in a metadata of the memory device;
    identifying a voltage bin associated with the one or more memory blocks; and
    determining the read voltage offset corresponding to the voltage bin and the value of the media endurance metric.

15. A non-transitory computer-readable storage medium comprising instructions that, when executed by a processing device, cause the processing device to perform operations comprising:
    receiving a request for performing a programming operation on one or more memory blocks of a memory device;
    identifying a value of a media endurance metric associated with the one or more memory blocks of the memory device;
    determining a programming voltage offset corresponding to the value of the media endurance metric;
    performing, using the programming voltage offset, the programming operation on the one or more memory blocks;
    identifying a program-verify voltage level associated with the one or more memory blocks;
    determining a program-verify voltage offset associated with the program-verify voltage level and the value of the media endurance metric; and
    performing, using the program-verify voltage level and the program-verify voltage offset, a program-verify operation on the one or more memory blocks.

16. The non-transitory computer-readable storage medium of claim 15, wherein the media endurance metric reflects a number of program-erase cycles performed on the one or more memory blocks.

17. The non-transitory computer-readable storage medium of claim 15, wherein the operations further comprise:
    identifying a read voltage level associated with the one or more memory blocks;
    determining a read voltage offset associated with the read voltage level and the value of the media endurance metric; and performing, using the read voltage level and the read voltage offset, a read operation on the one or more memory blocks.

18. The non-transitory computer-readable storage medium of claim 15, wherein identifying the value of the media endurance metric associated with the one or more memory blocks further comprises:
   accessing a program-erase counter stored in a metadata of the memory device; and
   identifying, based on a value of the program-erase counter, a number of program-erase operations performed on the one or more memory blocks.

19. The non-transitory computer-readable storage medium of claim 15, wherein determining the programming voltage offset corresponding to the value of the media endurance metric further comprises:
   accessing an offset look-up table stored in a metadata of the memory device;
   identifying a wordline group associated with the one or more memory blocks; and
   determining the programming voltage offset corresponding to the wordline group and the value of the media endurance metric.

20. The non-transitory computer-readable storage medium of claim 15, wherein determining the program-verify voltage offset further comprises:
   accessing an offset look-up table stored in a metadata of the memory device;
   identifying a voltage bin associated with the one or more memory blocks; and
   determining the program-verify voltage offset corresponding to the voltage bin and the value of the media endurance metric.

* * * * *